US009182999B2

(12) United States Patent
Lueck et al.

(10) Patent No.: US 9,182,999 B2
(45) Date of Patent: Nov. 10, 2015

(54) REINTIALIZATION OF A PROCESSING SYSTEM FROM VOLATILE MEMORY UPON RESUMING FROM A LOW-POWER STATE

(75) Inventors: Andrew William Lueck, Austin, TX (US); Krishna Sai Bernucho, Austin, TX (US); Alexander J. Branover, Chestnut Hill, MA (US); Paul Edward Kitchin, Austin, TX (US); Ronald Perez, Austin, TX (US); Sonu Arora, Malleswaram (IN)

(73) Assignee: Advanced Micro Devices, Inc., Sunnyvale, CA (US)

( * ) Notice: Subject to any disclaimer, the term of this patent is extended or adjusted under 35 U.S.C. 154(b) by 491 days.

(21) Appl. No.: 13/547,701

(22) Filed: Jul. 12, 2012

(65) Prior Publication Data
US 2013/0326206 A1 Dec. 5, 2013

(30) Foreign Application Priority Data
May 30, 2012 (IN) .......................... 1637/DEL/2012

(51) Int. Cl.
G06F 1/32 (2006.01)
G06F 9/44 (2006.01)
(52) U.S. Cl.
CPC .................................... G06F 9/4418 (2013.01)
(58) Field of Classification Search
None
See application file for complete search history.

(56) References Cited

U.S. PATENT DOCUMENTS

| 5,448,521 | A  | * | 9/1995  | Curry et al. ............. 365/189.02 |
| 6,266,776 | B1 | * | 7/2001  | Sakai ............................. 713/300 |
| 2004/0117318 | A1 | * | 6/2004  | Grawrock ....................... 705/66 |
| 2004/0225907 | A1 | * | 11/2004 | Jain et al. ...................... 713/320 |
| 2008/0126711 | A1 |   | 5/2008  | Hobson et al. |
| 2009/0204837 | A1 | * | 8/2009  | Raval et al. ................... 713/330 |
| 2011/0016300 | A1 | * | 1/2011  | Lee .................................. 713/2 |
| 2011/0219248 | A1 | * | 9/2011  | Cho et al. ...................... 713/323 |

FOREIGN PATENT DOCUMENTS

| EP | 1653331 A2 | 5/2006 |
| WO | 0133322 A2 | 5/2001 |

OTHER PUBLICATIONS

International Search Report and Written Opinion correlating to PCT/US13/043057 dated Sep. 20, 2013, 8 pages.

* cited by examiner

*Primary Examiner* — Paul Yanchus, III

(57) ABSTRACT

Boot configuration information is stored to a volatile memory of a processing system during a low-power state. When resuming from the low-power state, a processor device accesses configuration information for a memory controller from a non-volatile memory and restores the memory controller using the configuration information so as to permit access to the volatile memory. The processor device then configures the initial contexts one or more processor cores using the core state information maintained by the volatile memory during the low-power state and accessed via the configured memory controller, and the one or more processor cores completes the boot process by executing resume boot code maintained by the volatile memory during the low-power state and accessed via the configured memory controller, rather than accessing boot code from a non-volatile memory.

30 Claims, 4 Drawing Sheets

REINITIALIZATION OF A PROCESSING SYSTEM FROM VOLATILE MEMORY UPON RESUMING FROM A LOW-POWER STATE

BACKGROUND

1. Field of the Disclosure

The present disclosure generally relates to processing systems and more particularly to power state transitions for processing systems.

2. Description of the Related Art

Processing systems often implement one or more sleep states to reduce power consumption during periods of relative inactivity. Some of these sleep states involve removing one or more components of a processor device, or the entire processor device, from power, which necessitates reinitialization of the processor device upon exiting the sleep state before the operating system can resume control. This reinitialization conventionally is performed in the same manner as an initialization from a power-on reset, also called a "cold boot," which involves the execution of basic input/output system (BIOS) code accessed from a non-volatile memory external to the processor device. The access of the BIOS code from the non-volatile memory often is relatively slow and thus is a significant contributor to the relatively long wake-up latency exhibited by conventional processing systems when exiting such sleep states.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

Figure 1:
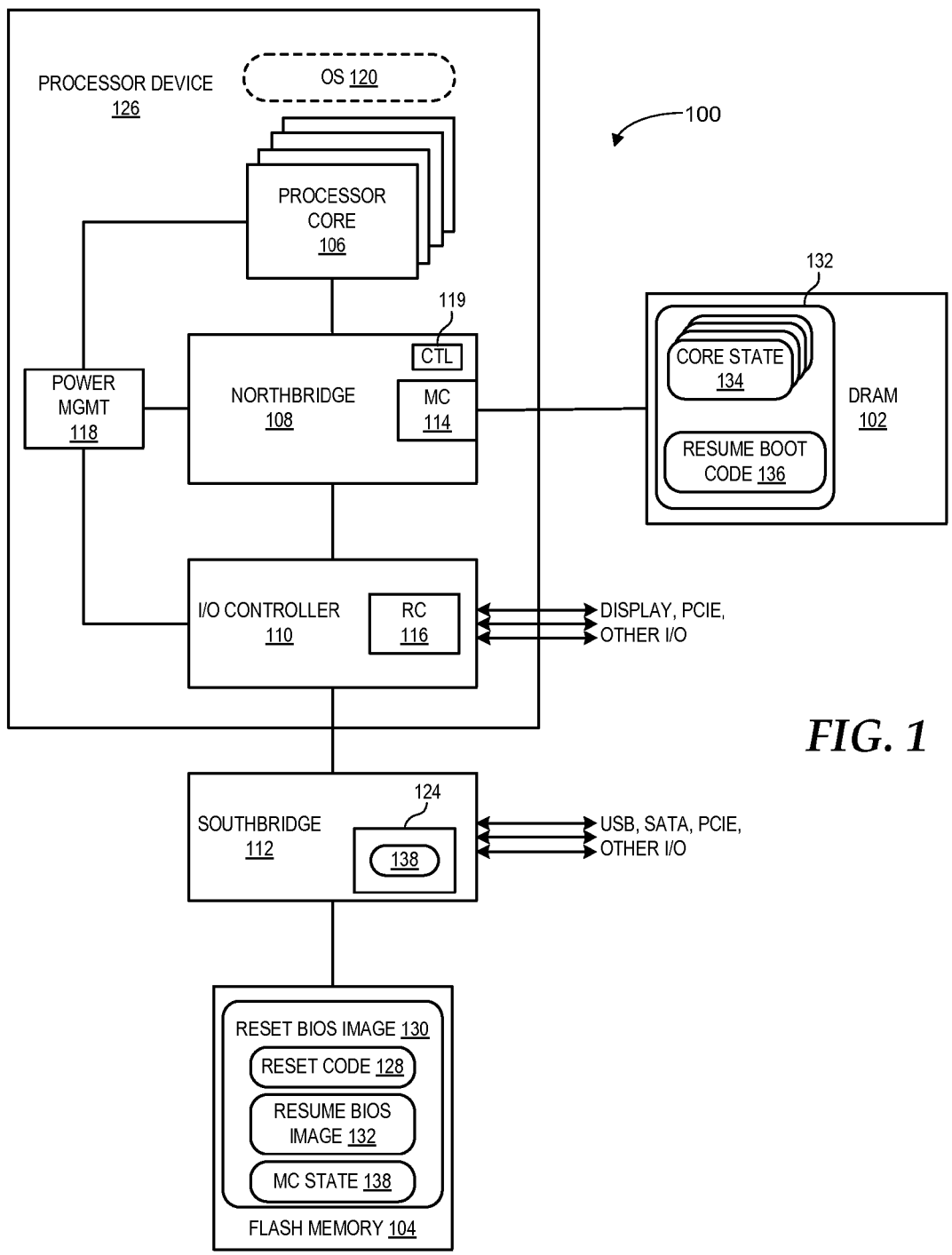
FIG. 1 is a block diagram illustrating a processing system in accordance with at least one embodiment of the present disclosure.

FIGS. 1-4 illustrate example techniques for a processing system to efficiently resume from a low-power state in which a processor device is powered down while power is maintained to a volatile memory. In one embodiment, resume boot configuration information is stored to a volatile memory as part of a boot process of the processing system from a power-on reset or other cold boot state. When an indicator to enter the low-power state is asserted, the processor device is powered down while at least a minimum voltage is provided to the volatile memory so as to permit the volatile memory to maintain stored information. Upon receiving an indicator to exit or resume from the low-power state, a resume controller of the processor device accesses configuration information for a memory controller from a non-volatile memory and configures or otherwise restores the memory controller using the configuration information so as to permit access to the volatile memory via the memory controller. The processor device then may configure the initial contexts, or states, of one or more processor cores using the core state information maintained by the volatile memory during the low-power state and accessed via the configured memory controller, and the one or more processor cores may complete the boot process by executing resume boot code maintained by the volatile memory during the low-power state and accessed via the configured memory controller. The access of the core state information and resume boot code from volatile memory during the process of resuming from the low-power state can result in a significantly reduced wake-up latency compared to conventional reinitializing processes which rely on boot code and other boot information accessed from non-volatile memory, this improved wake-up latency due at least in part to the difference in access times and throughput typically found between volatile memory and non-volatile memory. Moreover, this process provides improved operational security as it denies unauthorized access or configuration resulting from a modification or swap of the boot code in non-volatile memory.

In the following description, a distinction is made between "initializing" and "reinitializing" with respect to the processing device. Initializing the processing device occurs in response to a power-on reset, or "cold boot". In contrast, reinitializing the processing device occurs in response to a resume or return from a low-power state in which the processing device was powered down, or "warm boot." The term "boot" may refer to any of a variety of industry-standard or proprietary system initialization specifications or processes, basic input/output system (BIOS), extensible firmware interface (EFI), unified EFI (UEFI), and the like. For ease of discussion, the embodiments of the present disclosure may be described in the example context of BIOS. However, the present disclosure is not limited to implementations based on BIOS and reference to BIOS includes reference to other system initialization specifications unless otherwise noted.

FIG. 1 illustrates an example processing system 100 implementing an efficient resume-from-sleep process in accordance with at least one embodiment of the present disclosure. The processing system 100 can comprise, for example, a desktop computer, a notebook computer, a tablet computer, a server, a computing-enabled cellular phone, personal digital assistant, and the like. In the depicted example, the processing system 100 includes a volatile memory 102, a non-volatile memory 104, a set of one or more processor cores 106, a northbridge 108, an input/output (I/O) controller 110, a southbridge 112, a memory controller 114, a resume controller 116, and a power management controller 118.

For ease of illustration, the exemplary techniques of the present disclosure are described in a non-limiting example context whereby the volatile memory 104 comprises a dynamic random access memory (DRAM) and the non-volatile memory comprises a flash memory. Accordingly, the volatile memory 102 and the non-volatile memory 104 also are referred to below as the DRAM 102 and flash memory 104, respectively. However, the volatile memory 102 is not limited to DRAM, and instead could include, for example, static RAM (SRAM), thyristor RAM (T-RAM), zero-capacitance RAM, and the like. Likewise, the non-volatile memory 104 is not limited to flash memory, and instead could include, for example, read-only memory (ROM) or other types of non-volatile RAM, such as ferroelectric RAM (F-RAM), magnetoresistive RAM (M-RAM), and the like.

The processor cores 106 can comprise, for example, one or more central processing unit (CPU) cores, one or more graphics processing unit (GPU) cores, one or more digital signal processor (DSP) cores, as well as combinations thereof. To illustrate, the processing system 100 can include an accelerated processing unit (APU) comprising one or more CPU cores and one or more GPU cores. The northbridge 108 is coupled to the set of processor cores 106, the power management unit 118, the I/O controller 110, and is coupled or coupleable to the DRAM 102. The northbridge 108 includes, or is associated with, a set of control registers 119 used to control reset and resume operations as described herein.

The I/O controller 110 is coupled or coupleable to the southbridge 112 and acts as an interface between the northbridge 108 and the southbridge 112. The I/O controller 110 further can include one or more integrated I/O interfaces to connect to peripheral components, such a display interface (e.g., a high-definition multimedia interface (HDMI) to connect to a display), a Peripheral Component Interface—Express (PCIe) interface to connect to a discrete GPU, expansion card, or other peripheral, a universal serial bus (USB) interface to connect to one or more peripheral devices, and the like. The southbridge 112 is coupled to the flash memory 104 and acts as an interface between the I/O controller 110 and the flash memory 104. The southbridge 112 further can include one or more integrated I/O interfaces to connect to peripheral components, such a Serial Advanced Technology Attachment (SATA) interface to connect to one or more hard drives, a Peripheral Component Interface—Express (PCIe) interface to connect to a discrete GPU, expansion card, or other peripheral, a universal serial bus (USB) interface to connect to one or more peripheral devices, and the like. The memory controller 114 is coupled or coupleable to the DRAM 102 and acts as the interface for the DRAM 102. The memory controller 114 is depicted as part of the northbridge 108 in the illustrated example.

The power management controller 118 is configured to implement power states for certain components of the processing system 100 in accordance with one or more power-state specifications, such as in accordance with the Advanced Configuration and Power Interface (ACPI) specification. To illustrate, to implement a power state asserted by an operating system (OS) 120 or other component, the power management controller 118 can change clock frequencies for one or more components, connect or disconnect one or more components from a power rail, change a voltage supplied to one or more components, or combinations thereof.

The resume controller 116 is coupled to the memory controller 114 and coupled to a non-volatile memory in which memory controller (MC) configuration information for the memory controller 114 is stored. The non-volatile memory can include, for example, the flash memory 104 or an NVRAM 124 implemented at, for example, the southbridge 112. As described in greater detail below, in response to an indication that the processing system 102 is to resume from a sleep state, the resume controller 116 accesses the MC configuration information (MC state image 138) from the non-volatile memory and configures the memory controller 114 so as to enable access to the DRAM 102 via the memory controller 114. The resume controller 116 can be implemented as hard-wired logic and other circuitry to perform the functions described herein, as a microcontroller executing microcode or other firmware, or a combination thereof.

In at least one embodiment, the processing system 100 comprises a processor device 126 comprising one or more die, or "chips", in which the circuitry of certain components are formed. In the illustrated example, the processor device 126 is an integrated circuit (IC) device that includes the set of processor cores 106, the northbridge 108, the I/O controller 110, the memory controller 114, the resume controller 116, and the power management controller 118. The southbridge 112, the DRAM 102, and the flash memory 104 are implemented as external devices connected to the processor device 126 via, for example, a motherboard. In other embodiments, the processor device 126 can include one or more of the southbridge 112, the DRAM 102, and the flash memory 104.

The main operational processes of the processing system 100 of particular relevance in the present disclosure include: (1) the power-on reset, or "cold boot" process; (2) the suspend to sleep state S3 process; (3) and the resume from sleep state S3 process. During the power-on reset process, microcode is executed by one of the processor cores 106 acting as a bootstrap processor (BSP) to perform preliminary initialization of the processing system 100, after which the instruction pointer (IP) of each of one or more of the processor cores 106 is loaded with a reset vector associated with reset boot code 128 of a reset BIOS image 130 stored in the flash memory 104. The reset BIOS image 130 comprises reset boot configuration information used to initialize the processing system 100, such as the reset boot code 128 and other BIOS information. The processor cores 106 then execute the reset boot code 128 to complete initialization of the processing system 100, at which point control is transferred to the OS 120.

In one embodiment, the reset boot code 128 includes code configured to manipulate the processor device 126 to transfer a copy of a resume BIOS image 132 from the flash memory 104 to the DRAM 102, whereby the resume BIOS image 132 represents resume boot configuration information for use in reinitializing the processing system 100 when resuming from sleep state S3. The resume BIOS image 132 therefore can include one or more core state images 134 and resume boot code 136. Each core state image 134 comprises information representing the processor state of the corresponding processor core 106, including, for example, values in various registers, such as the machine state registers (MSR), general purpose registers (GPRs), floating point (FP) registers, as well as Advanced Programmable Interrupt Controller (APIC) state, various I/O subsystem state information, and the like. The resume boot code 136 includes code configured to manipulate the processor device 126 to complete reinitialization of the processor device 126. Further, the reset boot code 128 can include code configured to manipulate the processor device 126 to transfer a memory controller (MC) state image 138 to another non-volatile memory, such as the NVRAM 124. Alternatively, the MC state image 138 is maintained in the flash memory 104. The MC state image 138 comprises the MC configuration information used for configuring the memory controller 114, which can include, for example, timing information, address mapping information, etc. The power-on reset process is described in greater detail with reference to FIG. 3.

At some point during operation, the OS 120 can signal entry into the sleep state S3, in response to which the power management controller 118 initiates the suspend to sleep state S3 process. During this process, the processor device 126 is powered down and the DRAM 102 is placed in a self-refresh state. In the self-refresh state, the DRAM 102 maintains the resume boot configuration information associated with the resume BIOS image 132. This suspend to S3 sleep state process is described in greater detail with reference to FIG. 2.

At some subsequent point, the southbridge 112 can signal an exit from the sleep state S3 in response to a wake event, such as expiration of a wake timer, generation of an interrupt by a peripheral device, user manipulation of a power button or other "wake"-type button, and the like. In response to the signaled exit, the resume controller 116 accesses the MC state image 138 from the NVRAM 124 (or, alternatively, from the flash memory 104) and configures or otherwise restores the memory controller 114 so as to permit the processor device 126 access to the DRAM 102. Once the memory controller 114 is configured, the instruction pointer of each or one or more processor cores 106 is loaded with a corresponding resume vector of the resume boot code 136 and then the processor cores 106 are released to execute corresponding portions of the resume boot code 136 to complete reinitialization of the processing system 100. This resume from S3 sleep state process is described in greater detail with reference to FIG. 3.

Figure 2:
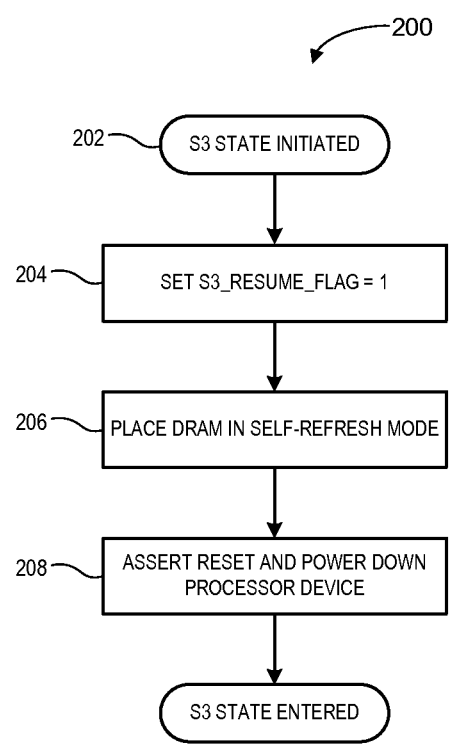
FIG. 2 is a flow diagram illustrating a method for entering a low-power state for a processing system in accordance with at least one embodiment of the present disclosure.

FIG. 2 illustrates a method 200 for preparing a processing system to suspend to the S3 sleep state in accordance with at least one embodiment of the present disclosure. For ease of discussion, the method 200 is described in the example context of the processing system 100 of FIG. 1. In response to a relatively long lull since a last user input or other sleep-mode condition, at block 202 the OS 120 signals a suspension to the S3 state by, for example, signaling an interrupt, such as a system management interrupt (SMI), that invokes an interrupt handler that places the processing system 100 in the S3 sleep state, or by direct OS or higher level software instruction.

The processor device 126 makes use of a flag S3_RESUME_FLAG to indicate whether a return from reset is due to a resume from the S3 sleep state or due to a power-on reset. Accordingly, at block 204, an interrupt handler or the resume controller 116 asserts the flag S3_RESUME_FLAG by storing a specified value (e.g., "1") to in one or more flops or other storage elements that will remain powered while the processing system 100 is in the S3 state. In one embodiment, the flag S3_RESUME_FLAG initially is stored at the NVRAM 124 of the southbridge 112 (which remains powered during the S3 sleep state), and the resume controller 116 subsequently moves a copy of this flag to the control registers 119 of the northbridge 108 as part of the process of resuming from the S3 sleep state.

At block 206, the interrupt handler or the resume controller 116 places the DRAM 102 in a self-refresh mode so as to maintain the information stored in the DRAM 102 while the processing system 100 is in the S3 state, and at block 208 the power management controller 118 asserts a reset signal and the processor device 126 is powered down for the duration that the reset signal remains asserted. The term "powered down," as used herein, refers to being placed in a state whereby the states of registers, caches, flops, and other storage elements are not reliably retained. This can be achieved by completely removing power from some or all of the components of the processor device 126, by providing a non-operational voltage to some or all of the components of the processor device (that is, providing a voltage lower than the retention voltage of the storage elements), by clock-gating some or all of the components of the processor device, and the like. At this point, the processing system 100 is considered to be in the S3 sleep state.

Figure 3:
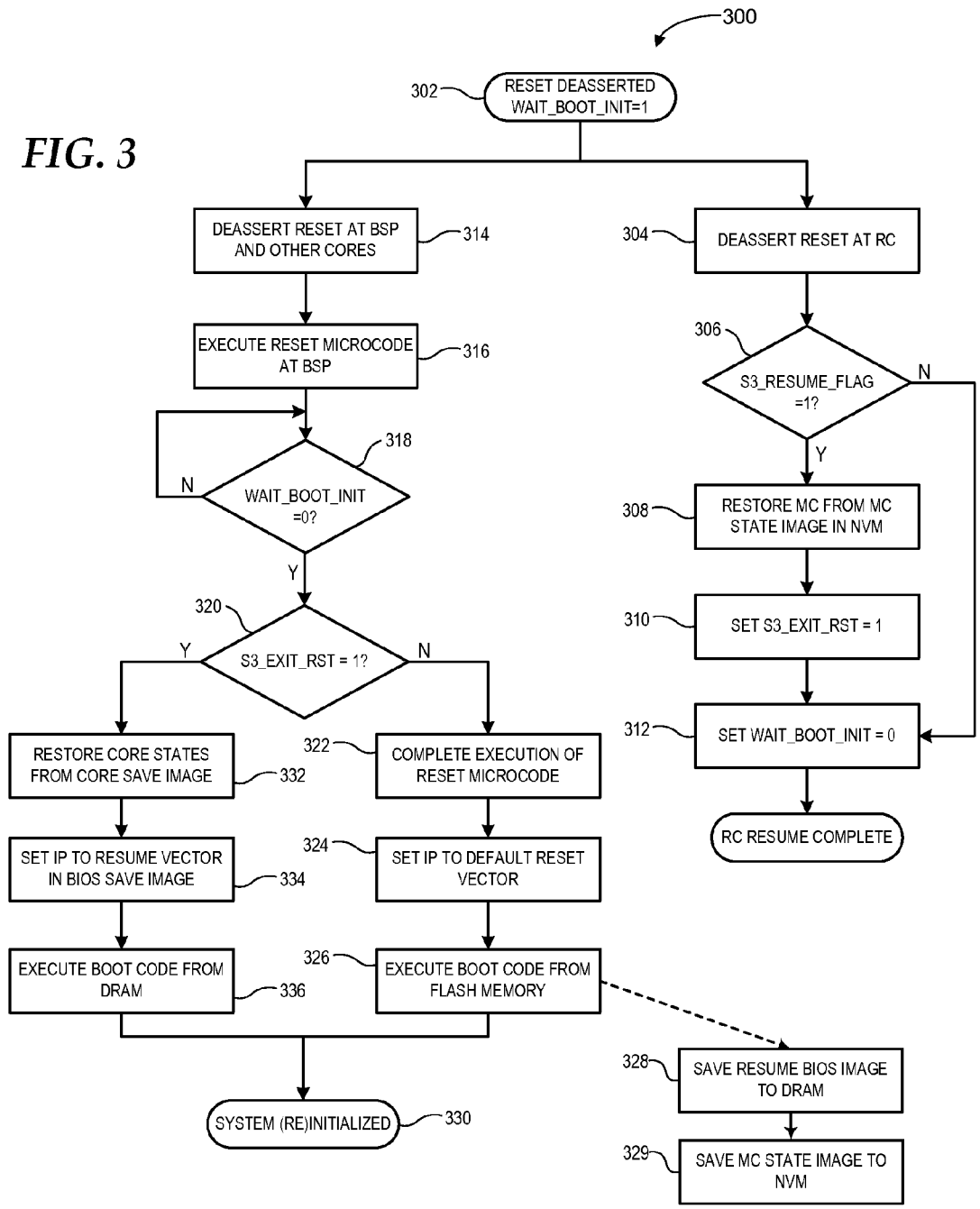
FIG. 3 is a flow diagram illustrating a method for initializing and reinitializing a processing system in accordance with at least one embodiment of the present disclosure.

FIG. 3 illustrates an example method 300 for initializing the processor device 126 from either a power-on reset or a resume from the S3 sleep state in accordance with at least one embodiment of the present disclosure. The method 300 initiates at block 302, whereby the reset signal for the processor device 126 is deasserted. The deassertion of the reset signal can occur due to a power-on reset, thereby signaling a cold boot, or due to signaling indicating a resume to an operational state from the S3 sleep state. The latter may be signaled by, for example, expiration of a timer, in response to a user manipulation of a power button or user input device while the processing system 100 is in the S3 sleep state, etc. The processor device 126 makes use of a flag WAIT_BOOT_INIT to stall the processor cores 106 from executing boot code until preliminary initialization is performed, and thus this flag may be initialized to a stall state at block 302 by setting WAIT_BOOT_INIT=1.

At block 304, the deassertion of the reset is propagated to the resume controller 116, which initiates its resume process by checking the state of the flag S3_RESUME_FLAG at block 306. If the resume controller 116 determines the S3_RESUME_FLAG is asserted (e.g., equal to 1), and thus indicating that the deassertion of the reset was a result of a resume from the S3 state, at block 308 the resume controller 116 takes the DRAM 102 out of self-refresh mode. The resume controller 116 then accesses the MC state image 138 from the flash memory 104 or the NVRAM 124 in which it was stored during the S3 sleep state and configures or otherwise restores the previous state of the memory controller 114 using the context information represented in the MC state image 138. This configuration can include restoring timing information for the memory controller 114, restoring the previous address mapping information (e.g., configuring the page tables), and the like.

The processor device 126 makes use of a flag S3_EXIT_RST to signal to the BSP whether a return from reset is a resume from the S3 state. After configuring the memory controller 114, the resume controller 116 asserts the flag S3_EXIT_RST at block 310. As noted above, the processor device 126 makes use of the flag WAIT_BOOT_INIT to stall the processor cores 106 from executing boot code until preliminary initialization is performed. Accordingly, after restoring the memory controller 114 and asserting the flag S3_EXIT_RST, at block 312 the resume controller 116 deasserts the flag WAIT_BOOT_INIT, thereby releasing the BSP and other processor cores 106 to begin execution as described below. The flags S3_EXIT_RST and WAIT_BOOT_INIT may be located at, for example, one or more of the control registers 119 of the northbridge 108.

Returning to block 306, if the resume controller 116 determines the S3_RESUME_FLAG is not asserted, thereby indicating a power-on reset or return from a state other than the S3 sleep state, the flag S3_EXIT_RST remains unasserted (e.g., "0") and the flow of method 300 jumps from block 306 to block 312 whereby the flag WAIT_BOOT_INIT is deasserted as described above.

In parallel with the process of blocks 304-312, the deassertion of the reset at block 302 is propagated to the BSP and other processor cores 106 at block 314. In response, at block 316 the BSP initiates execution of reset microcode to preliminarily initialize the processor device 126, such as by performing a power-on self test (POST), running core built-in self-test (BIST), distributing fuses to the cores, and initializing internal context needed to prepare for the remainder of the initialization sequence. After the preliminary initialization is completed, at block 318 the processor cores 106 repeatedly poll the flag WAIT_BOOT_INIT in the control registers 119 until the flag is deasserted, thereby releasing the processor cores 106 to begin execution. Once so released, at block 320 the processor cores 106 access the flag S3_EXIT_RST to determine whether the deassertion of the reset at block 302 was caused by a power-on reset (S3_EXIT_RST=0) or caused by a resume from the S3 sleep state (S3_EXIT_RST=1).

In the event that the flag S3_EXIT_RST is deasserted (e.g., "0"), the flow of method 300 turns to a BIOS initialization process conducted using the flash memory 104. Accordingly, at block 322 the BSP completes execution of the reset microcode, and thus completes the preliminary initialization of the processor device 126. In response, at block 324 the instruction pointer of the BSP is set to the default reset vector used for cold boot BIOS initialization and at block 326 the BSP begins execution of the reset boot code 128 of the reset BIOS image 130 from the flash memory 104 to complete the system initialization process. In one embodiment, the reset boot code 128 includes instructions to manipulate the BSP to store a copy of the resume BIOS image 132 in the DRAM 102 and thus execution of the reset boot code 128 can include the transfer of a copy of the resume BIOS image 132 from the flash memory 104 to the DRAM 102 at block 328 and a transfer of a copy of the MC state image 138 from the flash memory 104 to the NVRAM 124 at block 329. When execution of the reset boot code 128 completes, the IP of one or more of the processor cores 106 is set to the initial vector of the OS 120 and control of the processing system 100 is transferred to the OS 120 at block 330, thereby completing the initialization of the processing system 100.

Returning to block 320, in the event that the flag S3_EXIT_RST is asserted (e.g., "1"), the flow of method 300 turns to a BIOS reinitialization process conducted using resume boot configuration information stored in the DRAM 102 rather than the flash memory 104. Accordingly, at block 332 some or all of the processor cores 106 execute microcode or other firmware to access their corresponding core state image 134 from the DRAM 102 via the restored memory controller 114. Each processor core 106 then loads its context based on the context information stored in the corresponding core state image 134. Each core state image 134 includes a corresponding resume vector of the resume boot code 136 of the resume BIOS image 132 and at block 334 this resume vector is loaded into the instruction pointer of the corresponding processor core 106. At block 336, the processor cores 106 initiate execution of the resume boot code 136 from the DRAM 102 starting with the respective resume vectors to complete initialization of the processing system 100. When execution of the resume boot code 136 completes, the IP of one of the processor cores 106 is set to the initial vector of the OS 120 and control of the processing system 120 is transferred to the OS 120 at block 330, thereby completing the reinitialization of the processing system 100.

In at least one embodiment, the apparatus and techniques described above are implemented in a system comprising one or more integrated circuit (IC) devices (also referred to as integrated circuit packages or microchips), such as the processor device 126 of FIG. 1. Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Figure 4:
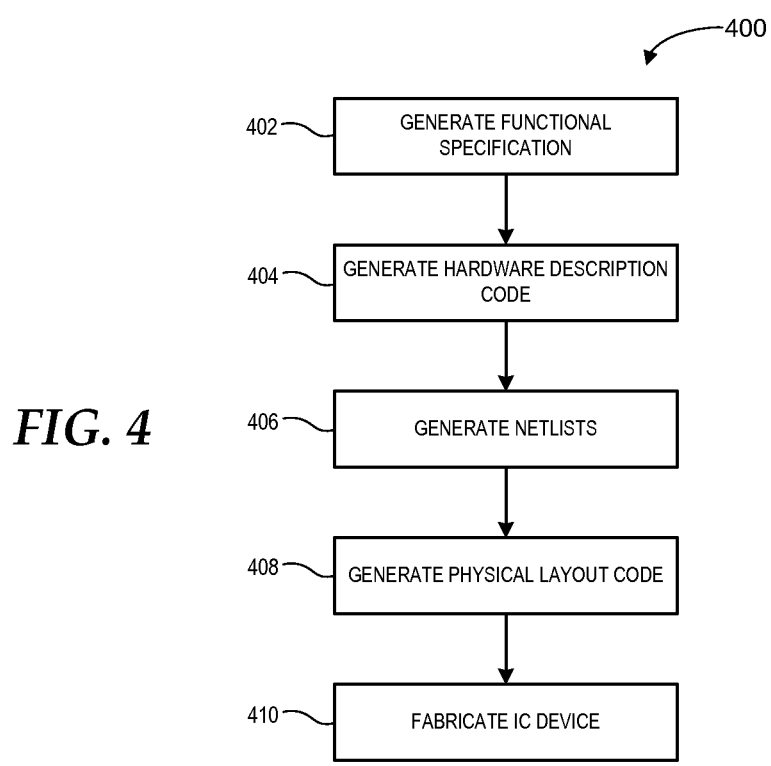
FIG. 4 is a flow diagram illustrating a method for designing and fabricating an integrated circuit (IC) device in accordance with at least one embodiment of the present disclosure.

FIG. 4 is a flow diagram illustrating an example method 400 for the design and fabrication of an IC device implementing one or more aspects of the present invention in accordance with at least one embodiment of the present disclosure. As noted above, the code generated for each of the following processes is stored or otherwise embodied in computer readable storage media for access and use by the corresponding design tool or fabrication tool.

At block 402 a functional specification for the IC device is generated. The functional specification (often referred to as a micro architecture specification (MAS)) may be represented by any of a variety of programming languages or modeling languages, including C, C++, SystemC, Simulink, or MATLAB.

At block 404, the functional specification is used to generate hardware description code representative of the hardware of the IC device. In at least one embodiment, the hardware description code is represented using at least one Hardware Description Language (HDL), which comprises any of a variety of computer languages, specification languages, or modeling languages for the formal description and design of the circuits of the IC device. The generated HDL code typically represents the operation of the circuits of the IC device, the design and organization of the circuits, and tests to verify correct operation of the IC device through simulation. Examples of HDL include Analog HDL (AHDL), Verilog HDL, SystemVerilog HDL, and VHDL. For IC devices implementing synchronized digital circuits, the hardware descriptor code may include register transfer level (RTL) code to provide an abstract representation of the operations of the synchronous digital circuits. For other types of circuitry, the hardware descriptor code may include behavior-level code to provide an abstract representation of the circuitry's operation. The HDL model represented by the hardware description code typically is subjected to one or more rounds of simulation and debugging to pass design verification.

After verifying the design represented by the hardware description code, at block 406 a synthesis tool is used to synthesize the hardware description code to generate code representing or defining an initial physical implementation of the circuitry of the IC device. In one embodiment, the synthesis tool generates one or more netlists comprising circuit device instances (e.g., gates, transistors, resistors, capacitors, inductors, diodes, etc.) and the nets, or connections, between the circuit device instances. Alternatively, all or a portion of a netlist can be generated manually without the use of a synthesis tool. As with the hardware description code, the netlists may be subjected to one or more test and verification processes before a final set of one or more netlists is generated.

Alternatively, a schematic editor tool can be used to draft a schematic of circuitry of the IC device and a schematic capture tool then may be used to capture the resulting circuit diagram and to generate one or more netlists (stored on a computer readable media) representing the components and connectivity of the circuit diagram. The captured circuit diagram may then be subjected to one or more rounds of simulation for testing and verification.

At block 408, one or more EDA tools use the netlists produced at block 406 to generate code representing the physical layout of the circuitry of the IC device. This process can include, for example, a placement tool using the netlists to determine or fix the location of each element of the circuitry of the IC device. Further, a routing tool builds on the placement process to add and route the wires needed to connect the circuit elements in accordance with the netlist(s). The resulting code represents a three-dimensional model of the IC device. The code may be represented in a database file format, such as, for example, the Graphic Database System II (GDSII) format. Data in this format typically represents geometric shapes, text labels, and other information about the circuit layout in hierarchical form.

At block 410, the physical layout code (e.g., GDSII code) is provided to a manufacturing facility, which uses the physical layout code to configure or otherwise adapt fabrication tools of the manufacturing facility (e.g., through mask works) to fabricate the IC device. That is, the physical layout code may be programmed into one or more computer systems, which may then control, in whole or part, the operation of the tools of the manufacturing facility or the manufacturing operations performed therein.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A method comprising:
in response to an indication to resume from a low-power state in which a processor device is powered down, reinitializing the processor device using first boot configuration information stored in a volatile memory during the low-power state, wherein reinitializing the processor device comprises:
configuring a context of a processor core of the processor device based on core state information of the first boot configuration information, wherein configuring the context of the processor core comprises setting an instruction pointer of the processor core to a reset vector for first boot code of the first boot configuration information; and
executing, using the processor core, the first boot code.

2. The method of claim 1, wherein reinitializing the processor device further comprises:
configuring a memory controller of the processor device using memory controller configuration information stored in a non-volatile memory; and
accessing the first boot configuration information from the volatile memory via the configured memory controller.

3. The method of claim 2, wherein configuring the memory controller comprises configuring at least one of timing information and address mapping information.

4. The method of claim 1, wherein configuring the context of the processor core further comprises at least one of: restoring one or more register values of the processor core using the core state information; restoring an interrupt controller state using the core state information; and restoring one or more input/output (I/O) subsystems.

5. The method of claim 1, further comprising:
initializing the processor device by executing second boot code stored in a non-volatile memory in response to a power-on reset of the processor device, wherein initializing the processor device by executing second boot code comprises storing the core state information in the volatile memory; and
placing the processor device in the low-power state subsequent to initializing the processor device.

6. The method of claim 1, further comprising:
initializing the processor device using second boot configuration information stored in a non-volatile memory in response to a power-on reset of the processor device; and
placing the processor device in the low-power state subsequent to initializing the processor device.

7. The method of claim 6, wherein:
initializing the processor device comprises executing boot code of the second boot configuration information to transfer a copy of the first boot information from the non-volatile memory to the volatile memory.

8. The method of claim 1, wherein the low-power state is substantially compliant with an S3 sleep state specified by an Advanced Configuration and Power Interface (ACPI) specification.

9. A method comprising:
in response to an indication to resume from a low-power state in which a processor device is powered down:
configuring a memory controller of the processor device;
accessing, by the processor device, configuration information from a volatile memory using the memory controller;
setting, using the configuration information, an instruction pointer of a processor core of the processor device to a reset vector for boot code maintained in the volatile memory during the low-power; and
executing, at the processor device, the boot code accessed from the volatile memory via the memory controller.

10. The method of claim 9, wherein the low-power state is substantially compliant with an S3 sleep state specified by an Advanced Configuration and Power Interface (ACPI) specification.

11. The method of claim 9, wherein the method further comprises:
storing, at a non-volatile memory, memory controller configuration information; and
wherein configuring the memory controller comprises accessing the memory controller configuration information from the non-volatile memory and configuring the memory controller using the memory controller configuration information.

12. The method of claim 11, wherein the memory controller configuration information comprises at least one of timing information and address mapping information.

13. The method of claim 9, wherein the boot code comprises first boot code and the method further comprises:
in response to a power-on reset of the processor device:
executing, at the processor device, second boot code accessed from a non-volatile memory; and
transferring the first boot code from the non-volatile memory to the volatile memory.

14. A system comprising:
a processor device comprising:
a memory controller coupleable to a volatile memory;
a reset controller coupled to the memory controller, the reset controller to configure the memory controller in response to an indication to resume from a low-power state in which the processor device is powered down; and
a processor core coupled to the memory controller, the processor core to reinitialize the processor device using boot configuration information accessed from the volatile memory via the memory controller in response to the indication to resume from the low-power state, wherein the boot configuration information comprises boot code and wherein the processor core is to reinitialize the processor device by setting an instruction pointer of a processor core to a reset vector for the boot code and executing the boot code using the processor core.

15. The system of claim 14, wherein the boot configuration information comprises first boot configuration information and the processor core further is to initialize the processor device using second boot configuration information accessed from a non-volatile memory in response to a power-on reset.

16. The system of claim 15, further comprising:
the non-volatile memory, the non-volatile memory to store the second boot configuration information, the second boot configuration information comprising boot code that, when executed by the processor core, manipulates the processor core to store at least a portion of the first boot configuration information to the volatile memory.

17. The system of claim 16, wherein the processor core further is to execute the boot code from the non-volatile memory in response to the power-on reset.

18. The system of claim 15, wherein the volatile memory comprises at least one of a dynamic random access memory (DRAM) or a static random access memory (SRAM) and the non-volatile memory comprises at least one of a flash memory, a non-volatile random access memory (NVRAM), or a read-only memory (ROM).

19. The system of claim 14, wherein the low-power state is substantially compliant with an S3 sleep state specified by an Advanced Configuration and Power Interface (ACPI) specification.

20. A non-transitory computer readable medium storing code which is operable to adapt at least one computer system to perform a portion of a process to fabricate at least part of an integrated circuit (IC) device including circuitry described by the code, the circuitry operable to:
reinitialize the IC device using first boot configuration information stored in a volatile memory during a low-power state in which the IC device is powered down, wherein the circuitry is operable to reinitialize the IC device by:
configuring a context of a processor core of the IC device based on core state information of the first boot configuration information, wherein configuring the context of the processor core comprises setting an instruction pointer of the processor core to a reset vector for boot code of the first boot configuration information based on the configuration information; and
executing, using the processor core, the first boot code.

21. The non-transitory computer readable medium of claim 20, wherein the circuitry is operable to reinitialize the IC device by:
configuring a memory controller of the IC device using memory controller configuration information stored in a non-volatile memory; and
accessing the first boot configuration information from the volatile memory via the memory controller.

22. The non-transitory computer readable medium of claim 20, wherein the circuitry is further operable to:
initialize the IC device using second boot configuration information stored in a non-volatile memory in response to a power-on reset of the IC device; and
place the IC device in the low-power state subsequent to initializing the IC device.

23. A method comprising:
initializing a processor device by executing first boot code stored in a non-volatile memory in response to a power-on reset; and
subsequently reinitializing the processor device in response to an indication to resume from a low-power state in which the processor device is powered down by executing second boot code retained in a volatile memory while the processor device was in the low-power state;
wherein the second boot code is stored in the non-volatile memory and initializing the processor device comprises executing the first boot code to transfer a copy of at least a portion of resume boot information from the non-volatile memory to the volatile memory, the resume boot information comprising the second boot code;
wherein the resume boot information further comprises core state information representing a context of a processor core and memory controller configuration information representing a configuration of a memory controller of the processor device; and
wherein subsequently reinitializing the processor device comprises:
configuring the memory controller based on the memory controller configuration information; and
configuring the processor core using the core state information accessed from the volatile memory via the configured memory controller, wherein configuring the processing core comprises setting an instruction pointer of the processor core to a resume vector of the second boot code.

24. A system comprising:
a processor device coupleable to a volatile memory and coupleable to a non-volatile memory, the processor to initialize by executing first boot code stored in the non-volatile memory in response to a power-on reset, and to subsequently reinitialize in response to an indication to resume from a low-power state in which the processor device is powered down by configuring a processor core of the processor device using core state information accessed from the volatile memory via the configured memory controller and executing second boot code retained in the volatile memory while the processor device was in the low-power state using the processor core, wherein configuring the processor core comprises setting an instruction pointer of the processor core to a resume vector of the second boot code.

25. The system of claim 24, further comprising:
the volatile memory to store the second boot code;
the non-volatile memory, the non-volatile memory to store the first boot code and the second boot code; and
wherein the first boot code includes boot code that, when executed by the processor device, manipulates the processor device to transfer the second boot code to the volatile memory.

26. The system of claim 25, wherein the processor device further is to initialize by storing a context of a processor core as the core state information at the volatile memory and by storing a configuration of a memory controller of the processor device as memory controller state information.

27. The system of claim 26, wherein the processor device is to subsequently reinitialize the processor device by configuring the memory controller based on the memory controller state information.

28. The method of claim 1, wherein the first boot code comprises at least one of: basic input/output system (BIOS) code; extensible firmware interface (EFI) code; and unified EFI (UEFI) code.

29. The system of claim 14, wherein the boot code comprises at least one of: basic input/output system (BIOS) code; extensible firmware interface (EFI) code; and unified EFI (UEFI) code.

30. The method of claim 23, wherein the second boot code comprises at least one of: basic input/output system (BIOS) code; extensible firmware interface (EFI) code; and unified EFI (UEFI) code.

* * * * *